(12) United States Patent
Tseng et al.

(10) Patent No.: US 11,378,505 B1
(45) Date of Patent: Jul. 5, 2022

(54) METHOD OF MEASURING EXTENSIONAL VISCOSITY OF POLYMER MELTS AND CAPILLARY INJECTION SYSTEM

(71) Applicant: CORETECH SYSTEM CO., LTD., Zhubei (TW)

(72) Inventors: Huan-Chang Tseng, Hsinchu (TW); Rong-Yeu Chang, Hsinchu (TW); Chia-Hsiang Hsu, Zhubei (TW)

(73) Assignee: CORETECH SYSTEM CO., LTD., Zhubei (TW)

( * ) Notice: Subject to any disclaimer, the term of this patent is extended or adjusted under 35 U.S.C. 154(b) by 0 days.

(21) Appl. No.: 17/587,854

(22) Filed: Jan. 28, 2022

Related U.S. Application Data

(60) Provisional application No. 63/253,743, filed on Oct. 8, 2021.

(51) Int. Cl.
*G01N 11/04* (2006.01)
*G01N 11/08* (2006.01)
*G01N 11/00* (2006.01)

(52) U.S. Cl.
CPC ............ *G01N 11/04* (2013.01); *G01N 11/08* (2013.01); *G01N 2011/006* (2013.01); *G01N 2011/0026* (2013.01)

(58) Field of Classification Search
CPC .. G01N 11/04; G01N 11/08; G01N 2011/006; G01N 2011/0026
See application file for complete search history.

(56) References Cited

U.S. PATENT DOCUMENTS

| 10,710,285 B1 | 7/2020 | Tseng et al. | |
| 2003/0154883 A1* | 8/2003 | MacKey | D01F 9/00 106/206.1 |

OTHER PUBLICATIONS

F. N. Cogswell, Converging Flow of Polymer Melts in Extrusion Dies, Polymer Engineering and Science, Jan. 1972, vol. 12, No. 1, pp. 64-73.
D. M. Binding, An Approximate Analysis for Contraction and Converging Flows, Journal of non-Newtonian fluid mechanics, 27(1988) 179-189.
Perko, L., Friesenbichler, W., Obendrauf. W., Buchebner, V., Chaloupka, G., Elongational viscosity of rubber compounds and improving corresponding models, Advances in production engineering & management, vol. 8, No. 2, Jun. 2013, pp. 126-133.
A. G. Gibson, Die entry flow of reinforced polymers, Composites, vol. 20, No. 1, Jan. 1989, 57-64.

(Continued)

*Primary Examiner* — Paul M. West
(74) *Attorney, Agent, or Firm* — Muncy, Geissler, Olds & Lowe, P.C.

(57) ABSTRACT

The present disclosure provides a method of measuring an extensional viscosity of a polymer melt and a capillary injection system. The method includes the operations of: based on a weighted GNF viscosity model, obtaining a viscosity profile of the polymer melt according to a transport equation, a Navier Stokes equation, and a Trouton function; measuring a pressure drop of the polymer melt; obtaining a general viscosity of the polymer melt from the viscosity profile according to the pressure drop, wherein the general viscosity comprises a shear viscosity of the polymer melt and the extensional viscosity of the polymer melt; and extracting the extensional viscosity from the general viscosity.

12 Claims, 8 Drawing Sheets

(56) References Cited

OTHER PUBLICATIONS

Huan-Chang Tseng, A revistation of generalized Newtonain fluids, Society of Rheology, 64, 493-504, (2020).
A. B. Metzner, A. P. Metzner, Stress levels in rapid extensional flows of polymer fluids, Rheology Acta, Band 9, Heft 2 (1970), pp. 174-181.
R. Byron Bird, Robert C. Armstrong, Ole Hassager, Dynamics of polymeric liquids, Wiley-Interscience, 1987, New York, p. 4.
Faith A. Morrison, Understanding rheology, Oxford University, pp. 75-76, 2001.
M. M. Cross, Relation between viscoelasticity and shear-thinning behavior in liquids, Rheology Acta, 18, 609-614 (1979).
Christopher J. S. Petrie, Extensional viscosity: A critical discussion, J. Non-Newtonian Fluid Mech., 137 (2006), 15-23.
Debabrata Sarkar, Mahesh Gupta, Further investigation of the effect of elongation viscosity on entrance flow, J Reinf Plast Compos 20 1473-1484 (2001).
Rong Zheng, Roger I. Tanner, Xi-Hun Fan, Injection molding: Integration of Theory and Modeling Methods, Springer, Berlin, 2011, pp. 13-14.
Evan Mitsoulis, Markus Battisti, Andreas Neunhauserer, Leonhard Oerko, Walter Friesenbichler, Mahmoud Ansari, Savvas G. Hatzikiriakos, Flow behavior of rubber in capillary and injection moulding dies, Plastics, Rubber and composites, vol. 46, No. 3, 110-118, 2017.

\* cited by examiner

METHOD OF MEASURING EXTENSIONAL VISCOSITY OF POLYMER MELTS AND CAPILLARY INJECTION SYSTEM

CROSS-REFERENCE TO RELATED APPLICATIONS

This application claims the benefit of prior-filed provisional application with application No. 63/253,743, filed Oct. 8, 2021, which is incorporated by reference in its entirety.

TECHNICAL FIELD

The present disclosure relates to a method of measuring rheological characteristics and a capillary injection system, and more particularly, to a method and capillary injection system of measuring an extensional viscosity.

DISCUSSION OF THE BACKGROUND

A viscosity is an important characteristic in rheology. The viscosity includes a shear viscosity and an extensional viscosity. Conventionally, it is difficult to obtain an accurate measurement of the extensional viscosity. However, an inaccurate measurement of the extensional viscosity would affect a quality of a rheological analysis. Therefore, it is critical to obtain the accurate extensional viscosity measurement.

This Discussion of the Background section is provided for background information only. The statements in this Discussion of the Background are not an admission that the subject matter disclosed in this section constitutes prior art to the present disclosure, and no part of this Discussion of the Background section may be used as an admission that any part of this application, including this Discussion of the Background section, constitutes prior art to the present disclosure.

SUMMARY

One aspect of the present disclosure provides a method of measuring an extensional viscosity of a polymer melt. The method includes operations of: based on a weighted generalized Newtonian fluid (GNF) viscosity model, obtaining a viscosity profile of the polymer melt according to a transport equation, a Navier Stokes equation, and a Trouton function; measuring a pressure drop of the polymer melt; obtaining a general viscosity of the polymer melt from the viscosity profile according to the pressure drop, wherein the general viscosity comprises a shear viscosity of the polymer melt and the extensional viscosity of the polymer melt; and extracting the extensional viscosity from the general viscosity.

In some embodiments, the polymer melt flows through a capillary, and a difference between a pressure at an outlet of the capillary and a pressure at an inlet of the capillary is the pressure drop.

In some embodiments, based on the weighted GNF viscosity model, obtaining the viscosity profile of the polymer melt according to the transport equation, the Navier Stokes equation, and the Trouton function includes operations of: determining a plurality of conditional parameters of the transport equation and the Navier Stokes equation; determining a plurality of computational parameters of the Trouton function; obtaining a Trouton ratio of the Trouton function according to the plurality of computational parameters; based on the weighted GNF viscosity model, obtaining an estimated pressure drop of the polymer melt according to the Trouton ratio, the transport equation, and the Navier Stokes equation; determining whether an error of the estimated pressure drop is within a threshold; and when the error of the estimated pressure drop is within the threshold, obtaining the viscosity profile according to the plurality of conditional parameters and the plurality of computational parameters.

In some embodiments, when the error of the estimated pressure drop is not within the threshold, updating the plurality of computational parameters of the Trouton ratio function.

In some embodiments, when the error is a positive value, an initial temperature of the plurality of conditional parameters is increased 1 degree so as to update the predetermined temperature.

In some embodiments, when the error is a negative value, an initial temperature of the plurality of conditional parameters is decreased 1 degree so as to update the predetermined temperature.

In some embodiments, the plurality of conditional parameters comprises a predetermined velocity vector of the polymer melt, a predetermined temperature of the polymer melt, and a predetermined pressure drop of the polymer melt.

In some embodiments, based on the GNF viscosity model, obtaining the estimated pressure drop of the polymer melt according to the Trouton ratio, the transport equation, and the Navier Stokes equation includes operations of: obtaining an estimated velocity vector of the polymer melt according to the transport equation; obtaining an estimated strain rate of the polymer melt according to the weighted GNF viscosity model; obtaining an estimated temperature of the polymer melt and an estimated pressure of the polymer melt according to the Navier Stokes equation, the estimated velocity vector, and the estimated strain rate; and obtaining the estimated pressure drop according to the estimated pressure. The estimated velocity vector, the estimated temperature, and the estimated pressure drop converge to the predetermined velocity vector, the predetermined temperature, and the predetermined pressure drop, respectively.

In some embodiments, the error of the estimated pressure drop is equal to a difference between the estimated pressure drop and the predetermined pressure drop divided by the predetermined pressure drop.

In some embodiments, the threshold is about ±10%.

In some embodiments, the Tronton function is represented using an expression:

$$T_r(\dot{\gamma}) = \frac{\eta_E}{\eta_S}$$

$$T_r(\dot{\gamma}) = 3 + \frac{T_0}{[1 + (\lambda_T \dot{\gamma})^{-2}]^{n_T}}$$

wherein $T_r(\dot{\gamma})$ represents a Trouton ration with respect to a shear rate $\dot{\gamma}$, $\eta_E$ represents the extensional viscosity, $\eta_S$ represents a shear viscosity, $T_0$ represents an initial temperature, $\lambda_T$ represents a relaxation time, and $n_T$ represents a power index.

Another aspect of the present disclosure provides a capillary injection system for measuring an extensional viscosity of a polymer melt, including a barrel, a capillary, a piston, a first pressure transducer, a second pressure transducer, and a rheometer. The barrel has a cavity configured to contain a polymer melt. The capillary is coupled to the barrel. The piston is coupled to the barrel, and configured to provide a force to the polymer melt to make the polymer melt flow through the capillary. The first pressure transducer is configured to measure a first pressure of the polymer melt at an inlet of the capillary. The second pressure transducer is configured to measure a second pressure of the polymer melt at an outlet of the capillary. The rheometer is configured to perform operations of: based on a weighted GNF viscosity model, obtain a viscosity profile of the polymer melt according to a transport equation, a Navier Stokes equation, and a Trouton function; obtain a general viscosity of the polymer melt from the viscosity profile according to the first pressure and the second pressure, wherein the general viscosity comprises a shear viscosity of the polymer melt and the extensional viscosity of the polymer melt; and extract the extensional viscosity from the general viscosity.

The foregoing has outlined rather broadly the features and technical advantages of the present disclosure in order that the detailed description of the disclosure that follows may be better understood. Additional features and advantages of the disclosure will be described hereinafter, and form the subject of the claims of the disclosure. It should be appreciated by those skilled in the art that the conception and specific embodiment disclosed may be readily utilized as a basis for modifying or designing other structures or processes for carrying out the same purposes of the present disclosure. It should also be realized by those skilled in the art that such equivalent constructions do not depart from the spirit and scope of the disclosure as set forth in the appended claims.

BRIEF DESCRIPTION OF THE DRAWINGS

A more complete understanding of the present disclosure may be derived by referring to the detailed description and claims when considered in connection with the Figures, where like reference numbers refer to similar elements throughout the Figures.

DETAILED DESCRIPTION

Figure 1:
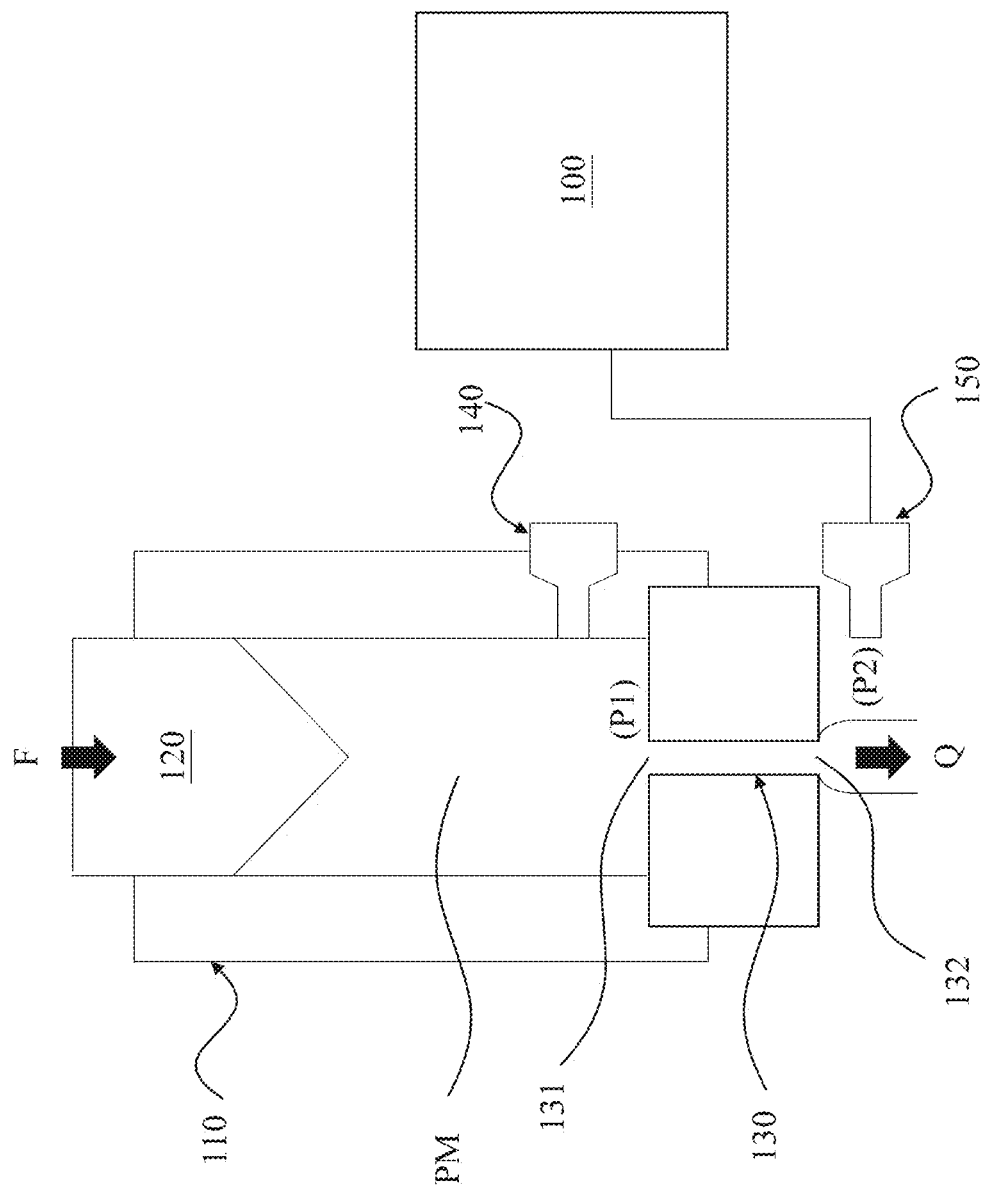
FIG. 1 is a schematic diagram of a capillary injection system according to some embodiments of the present disclosure.

Embodiments, or examples, of the disclosure illustrated in the drawings are now described using specific language. It shall be understood that no limitation of the scope of the disclosure is hereby intended. Any alteration or modification of the described embodiments, and any further applications of principles described in this document, are to be considered as normally occurring to one of ordinary skill in the art to which the disclosure relates. Reference numerals may be repeated throughout the embodiments, but this does not necessarily mean that feature(s) of one embodiment apply to another embodiment, even if they share the same reference numeral.

It shall be understood that, although the terms first, second, third, etc. may be used herein to describe various elements, components, regions, layers or sections, these elements, components, regions, layers or sections are not limited by these terms. Rather, these terms are merely used to distinguish one element, component, region, layer or section from another element, component, region, layer or section. Thus, a first element, component, region, layer or section discussed below could be termed a second element, component, region, layer or section without departing from the teachings of the present inventive concept.

The terminology used herein is for the purpose of describing particular example embodiments only and is not intended to be limiting to the present inventive concept. As used herein, the singular forms "a," "an" and "the" are intended to include the plural forms as well, unless the context clearly indicates otherwise. It shall be further understood that the terms "comprises" and "comprising," when used in this specification, point out the presence of stated features, integers, steps, operations, elements, or components, but do not preclude the presence or addition of one or more other features, integers, steps, operations, elements, components, or groups thereof.

FIG. 1 is a schematic diagram of a capillary injection system 10 according to some embodiments of the present disclosure. The capillary injection system 10 includes a rheometer 100, a barrel 110, a piston 120, a capillary 130, a pressure transducer 140, and a pressure transducer 150.

The capillary injection system 10 is configured to inject a polymer melt PM into a target object through the capillary 130, so as to measure an extensional viscosity of the polymer melt PM. The rheometer 100 is configured to measure behaviors (such as rheological properties) of the polymer melt PM during the injection.

The barrel 110 has a cavity configured to contain the polymer melt PM. The capillary 130 is coupled to the barrel 110, and configured to receive the polymer melt PM from an inlet 131 of the capillary 130 and dispense the polymer melt PM from an outlet 132 of the capillary 130. The piston 120 is configured to provide a force F to the polymer melt PM in the cavity. When the piston 120 is controlled to push the polymer melt PM in the barrel 110, the polymer melt PM is pushed toward the inlet 131 of the capillary 130. The polymer melt PM has a volumetric flow rate Q at the outlet 132 of the capillary 130 according to the force F. In some embodiments, the force F of the piston 120 is controlled by the rheometer 100.

The pressure transducers 140 and 150 are configured to measure a pressure P1 and a pressure P2 of the polymer melt PM at the inlet 131 and the outlet 132 of the capillary 130, respectively. According to the pressure P1 and the pressure P2, a pressure drop $\Delta P$ between two ends of the capillary 130 can be obtained. In some embodiments, some of the rheological properties are obtained according to the pressure drop $\Delta P$.

A viscosity of the polymer melt PM is critical for analyzing the behaviors of the polymer melt PM. Therefore, one function of the rheometer 100 is obtaining the viscosity of the polymer melt PM. In general, the viscosity includes a shear viscosity and an extensional viscosity. In some conventional approaches, the shear viscosity can be obtained by the rheometer 100; however, the extensional viscosity has seldom been studied. Therefore, the extensional viscosity cannot be obtained accurately, and an inaccurate extensional viscosity affects a performance of the rheometer 100. Compared to the conventional approaches, the present disclosure provides a method 20 (shown in FIG. 2) to obtain the accurate extensional viscosity to improve a quality of analysis. In some embodiments, the rheometer 100 is configured to perform the method 20 to obtain the extensional viscosity of the polymer melt PM.

Figure 2:
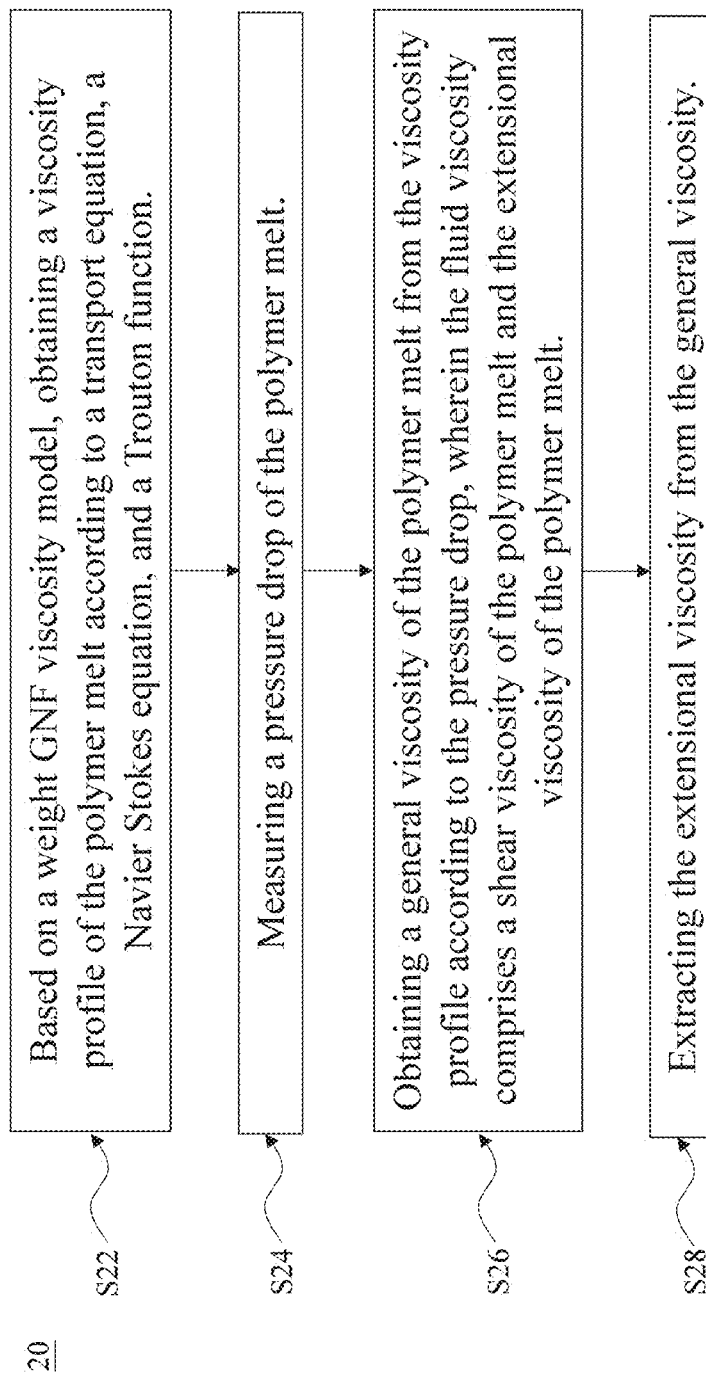
FIG. 2 is a flowchart of a method of measuring an extensional viscosity of a polymer melt according to some embodiments of the present disclosure.

Reference is made to FIG. 2. FIG. 2 is a flowchart of the method 20 according to some embodiments of the present disclosure. The method 20 is configured to measure the extensional viscosity of the polymer melt PM in a capillary, such as the capillary 130 shown in FIG. 1. More particularly, the method 20 is configured to measure the extensional viscosity of the polymer melt PM by measuring the pressure drop $\Delta P$ of the polymer melt PM. To facilitate understanding, the method 20 is described with same numerals as those shown in FIG. 1. The method 20 includes operations S22, S24, S26, and S28.

In operation S22, based on a weighted generalized Newtonian fluid (GNF) viscosity model (which will be described below), a viscosity profile $\eta(\dot{\gamma})$ of the polymer melt PM is obtained according to a transport equation, a Navier Stokes equation, and a Trouton function. $\dot{\gamma}$ is a strain rate. In some embodiments, the viscosity profile $\eta(\dot{\gamma})$ is obtained by the rheometer 100.

In operation S24, the pressure drop $\Delta P$ of the polymer melt PM is measured. In some embodiments, the pressure drop $\Delta P$ is measured by the pressure transducers 140 and 150.

In operation S26, a general viscosity $\eta$ of the polymer melt PM is obtained from the viscosity profile $\eta(\dot{\gamma})$ according to the pressure drop $\Delta P$. In some embodiments, the general viscosity $\eta$ is also known as a fluid viscosity. In general, the general viscosity $\eta$ includes the shear viscosity $\eta_S$ and the extensional viscosity $\eta_E$ of the polymer melt PM.

In operation S28, the extensional viscosity $\eta_E$ is extracted from the general viscosity $\eta$.

The operation S22 is configured to obtain the viscosity profile $\eta(\dot{\gamma})$, and further to obtain a relationship between the viscosity profile $\eta(\dot{\gamma})$ and the pressure drop $\Delta P$. In other words, the viscosity profile $\eta(\dot{\gamma})$ obtained by the operation S22 can be rewritten to be the viscosity profile $\eta(\Delta P)$. After operation S22, the pressure drop $\Delta P$ is measured (operation S24), and the general viscosity $\eta$ can be obtained (operation S26) from the viscosity profile $\eta(\Delta P)$ using the measured pressure drop $\Delta P$. When the general viscosity T is obtained, the extensional viscosity $\eta_E$ can be extracted (operation S28).

Figure 3:
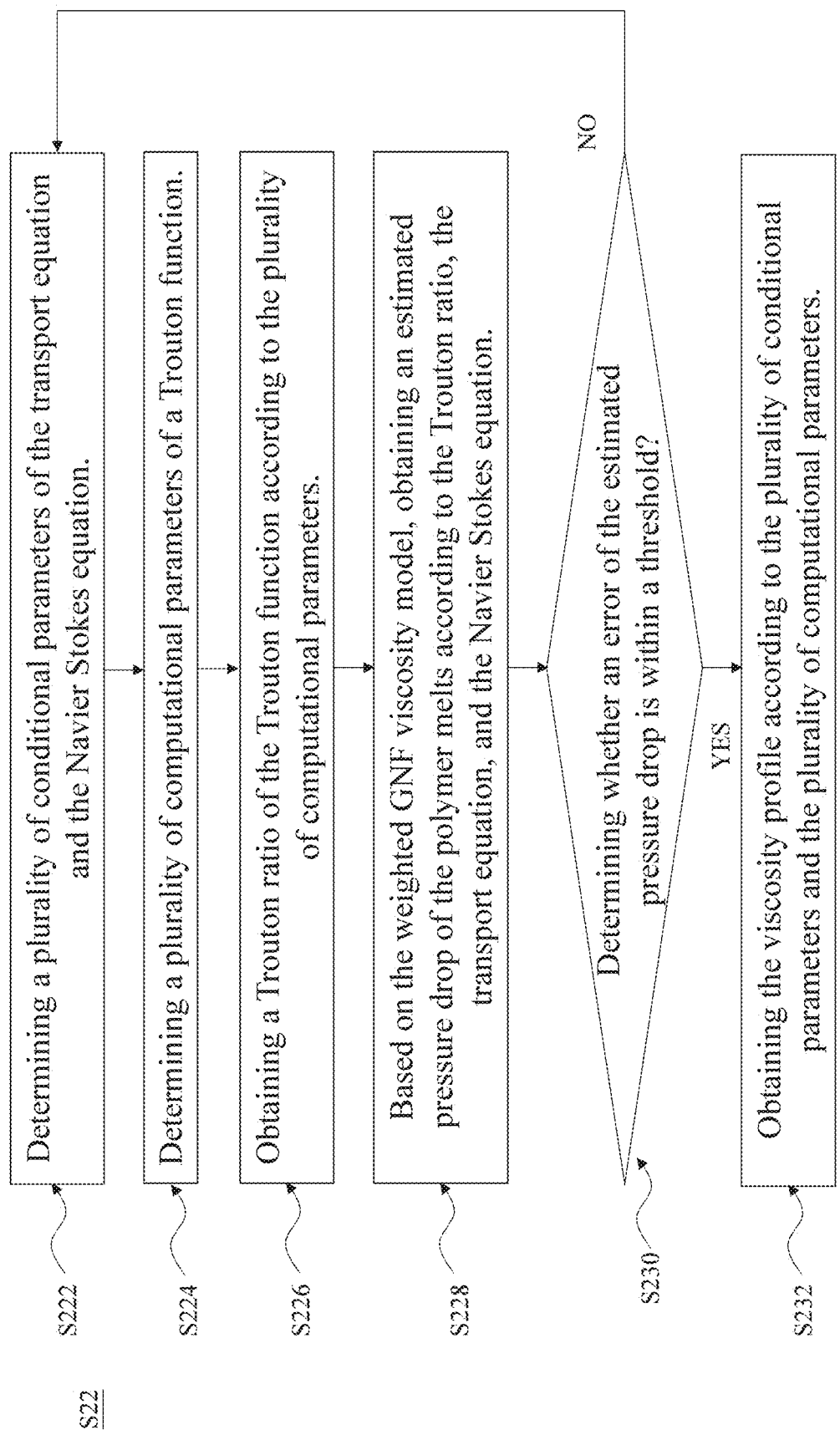
FIG. 3 is a detailed flowchart of the method shown in FIG. 2 according to some embodiments of the present disclosure.

Reference is made to FIG. 3. FIG. 3 is a detailed flowchart of operation S22 of the method 20 according to some embodiments of the present disclosure. Obtaining the viscosity profile $\eta(\dot{\gamma})$ (operation S22) includes operations S222, S224, S226, S228, S230 and S232.

In operation S222, a plurality of conditional parameters of the transport equation and the Navier Stokes equation are determined. The transport equation is expressed by an equation (1). The Navier Stokes equation is expressed by an equation (2), and can be rewritten to be an equation (3). In some embodiments, the equation (1) is also known as an equation of continuity; the equation (2) is also known as an equation of momentum; and the equation (3) is also known as an equation of energy.

$$\frac{\partial \rho}{\partial t} + \nabla \cdot \rho u = 0. \quad (1)$$

$$\frac{\partial}{\partial t}(\rho u) + \nabla \cdot (\rho u u) = -\nabla P - \nabla \cdot \tau + \rho g. \quad (2)$$

$$\rho C_p \left( \frac{\partial T}{\partial t} + u \cdot \nabla T \right) = \nabla \cdot (k \nabla T) + \tau : D. \quad (3)$$

$\rho$ is a density of the polymer melt PM; u is a velocity vector; t is time; $\tau$ is an extra stress tensor; $\nabla u$ is a velocity gradient tensor; D is a rate-of-deformation tensor; g is the acceleration vector of gravity; P is a pressure; $C_P$ is a specific heat of the polymer melt PM; T is a temperature; and k is a thermal conductivity.

In some embodiments, the conditional parameters include the temperature T, the force F (shown in FIG. 1), and a material of the polymer melt PM, and such conditional parameters are associated with variables shown in equations (1) to (3). For example, when the force F is determined (which can be controlled by the rheometer 100), the volumetric flow rate Q is determined, which affects the flowing behavior of the polymer melt PM and consequently affects solutions of the equations (1) to (3). As such, the variables in the equations (1) to (3) are associated with the force F. In other embodiments, the conditional parameters include other parameters which may affect the transport equation and the Navier Stokes equation. For example, the conditional parameters further include geometry of the capillary 130, such as a diameter and a length of the barrel 110 and the capillary 130. In some embodiments, the diameter and the length of the barrel 110 are 12 mm and 10 mm, respectively. In some embodiments, the diameter and the length of the capillary 130 are 1 mm and 0.2 mm, respectively. For another example, the conditional parameters further include isothermal melting temperature of the polymer melt PM. In some embodiments, the isothermal melting temperature is given over a range of shear rate from 10 s$^{-1}$ to 100 s$^{-1}$.

In operation S224, a plurality of computational parameters of the Trouton function are determined. In some embodiments, the computational parameters are determined according to experimental extensional viscosity data.

In operation S226, a Trouton ratio $T_r$ of the Trouton function is obtained according to the computational parameters. The Trouton function is expressed by equations (4) and (5).

$$T_r(\dot{\gamma}) = \frac{\eta_{UE}}{\eta_S}. \quad (4)$$

$$T_r(\dot{\gamma}) = 3 + \frac{T_0}{[1 + (\lambda_T \dot{\gamma})^{-2}]^{n_T}}. \quad (5)$$

The extensional viscosity $\eta_E$ includes a uniaxial extensional viscosity $\eta_E$, a planar extensional viscosity $\eta_{PE}$, and a biaxial extensional viscosity $\eta_{BE}$. In some embodiments, the extensional viscosity $\eta_E$ is substantially equal to the uniaxial extensional viscosity $\eta_{UE}$. The uniaxial extensional viscosity $\eta_{UE}$ and the shear viscosity is can be expressed by the equation (4). The computational parameters include $T_0$, $\lambda_T$, and $n_T$, wherein the $T_0$ is an anisotropic factor, the $\lambda_T$ is a relaxation time, and $n_T$ is a power index. In some embodiments, the computational parameters are fitted by experimental extensional viscosity data. In some embodiments, the experimental extensional viscosity data are obtained previously and stored in a storage device 110 (shown in FIG. 8) of the rheometer 100.

In some embodiments, the uniaxial extensional viscosity $\eta_{UE}$ is obtained based on a Binding approximation. The Binding approximation is described in detail in "An Approximate Analysis for Contraction and Converging Flows" published in the Journal of Non-Newtonian Fluid Mechanics Vol. 27, Issue 2, Pages 173-189, 1988, which is incorporated herein by reference in its entirety. For the sake of simplicity, the present disclosure does not elaborate the Binding approximation herein.

The Binding approximation provides limitations among the shear rate $\dot{\gamma}$, an extensional rate $\dot{\varepsilon}$, the extra stress tensor $\tau$, and the pressure drop $\Delta P$. The Binding approximation is expressed by equations (6) to (10).

$$\eta_{UE} = s\dot{\varepsilon}^{h-1}. \tag{6}$$

$$\dot{\varepsilon} = \frac{(3n-1)+(1+h)^2}{3h^2(n+1)^2} \frac{\tau_W}{\Delta P} \dot{\gamma}. \tag{7}$$

$$\tau_{11} - \tau_{22} = \frac{3h2^{h-1}(1+n)^2}{(1+h)^2(3n+1)I_{nk}} \Delta P. \tag{8}$$

$$h = \frac{d\ln\Delta P/d\ln\dot{\gamma}_W}{1+n-(d\ln\Delta P/d\ln\dot{\gamma}_W)}. \tag{9}$$

$$I_{nk} = \int_0^1 \left\{ \left|2 - \frac{3n+1}{n}\right| \xi^{(1+n)/n} \right\}^{h+1} \xi d\xi. \tag{10}$$

s is an index of flow consistency of extension; h is an index of and flow behavior of extension; $\tau_W$ is a wall stress; n is a power index; and $\dot{\gamma}_w$ is a wall shear rate.

In operation S228, based on the weighted GNF viscosity model, an estimated pressure drop $\Delta P_{est}$ of the polymer melt PM is obtained according to the Trouton ratio $T_r$, the transport equation, and the Navier Stokes equation. The details of operation S228 will be described below with respect to FIG. 4.

The weighted GNF viscosity model is modified from the general GNF viscosity model. More specifically, the weighted GNF viscosity model includes more limitations on the basis of the general GNF viscosity model. The weighted GNF viscosity model is described in detail in "A Revisitation of Generalized Newtonian Fluids" published in the Journal of Rheology Vol. 64, Issue 3, 2020, and in U.S. Pat. No. 10,710,285B, which are incorporated herein by reference in their entireties. The GNF viscosity model is expressed by an equation (11), and the weighted GNF viscosity model is further expressed by equations (12) to (15).

$$\tau = 2\eta_S(T, P, \dot{\gamma}) = 2\eta_E D. \tag{11}$$

$$\eta_W = (1-W)\eta_S + W\eta_E. \tag{12}$$

$$1 - W = \frac{\dot{\gamma}_S^2}{\dot{\gamma}^2}. \tag{13}$$

$$W = \frac{\dot{\gamma}_E^2}{\dot{\gamma}^2}. \tag{14}$$

$$\dot{\gamma}^2 = \dot{\gamma}_S^2 + \dot{\gamma}_E^2. \tag{15}$$

$\eta_W$ is a weighted shear/extensional viscosity; W is a weighting factor, which is also known as an extension fraction; and $\dot{\Gamma}_S$, $\dot{\Gamma}_E$, and $\dot{\gamma}$ are a principal shear rate, a principal extensional rate, and the strain rate, respectively. (1-W) and W represent shear-rate percentage and extension-rate percentage, respectively. For example, when W is equal to 0, the weighted GNF viscosity model returns to the general GNF viscosity model.

For a uniaxial extensional flow, the uniaxial extensional viscosity $\eta_{UE}$ is expressed by an equation (16), and the T and D can be expressed by equations (16) and (17), respectively.

$$\eta_{UE} = \frac{\tau_{11} - \tau_{22}}{\dot{\varepsilon}}. \tag{16}$$

$$\tau = \begin{bmatrix} \tau_{11} & 0 & 0 \\ 0 & \tau_{22} & 0 \\ 0 & 0 & \tau_{33} \end{bmatrix}. \tag{17}$$

$$D = \dot{\varepsilon} \begin{bmatrix} -\frac{1}{2} & 0 & 0 \\ 0 & -\frac{1}{2} & 0 \\ 0 & 0 & 1 \end{bmatrix}. \tag{18}$$

According to equations (4) to (19), the extensional viscosity $\eta_E$ for uniaxial extensional flow is expressed by an equation (19).

$$\eta_E = \frac{\eta_{UE}}{3}. \tag{19}$$

According to the equations (1) to (19), the pressure drop $\Delta P$ and the velocity vector u can be obtained by solving the equations (1), (2), (3) and (11) using the determined conditional parameters and the computational parameters. However, some of the conditional parameters and the computational parameters are fitting parameters, which means at least some of the equations (1), (2), (3) and (11) may deviate from the true values if those parameters are not fitted perfectly. As such, an operation S230 is performed to verify whether the equations (1), (2), (3) and (11) are fitted well. To facilitate understanding, before the calculation performed in the operation S228 converges, the pressure drop $\Delta P$, the strain rate $\dot{\gamma}$, the temperature T, the pressure P, and the velocity vector u obtained during the operation S228 are referred to as an estimated pressure drop $\Delta P_{est}$, an estimated strain rate $\dot{\Gamma}_{est}$, an estimated temperature $T_{est}$, an estimated pressure $P_{est}$, and an estimated velocity vector $u_{est}$, respectively.

In operation S230, it is determined whether an error E of the estimated pressure drop $\Delta P_{est}$ is within a threshold $E_{th}$. The error E of the estimated pressure drop $\Delta P_{est}$ is equal to a difference between the estimated pressure drop $\Delta P_{est}$ and the predetermined pressure drop $\Delta P_{pre}$ divided by the predetermined pressure drop $\Delta P_{pre}$. In some embodiments, the threshold $E_{th}$ is about ±10%. In some embodiments, the predetermined pressure drop $\Delta P_{pre}$ is measured by the pressure transducers 140 and 150. Alternatively stated, the predetermined pressure drop $\Delta P_{pre}$ is a measured value or an experimental data.

When the error E of the estimated pressure drop $\Delta P_{est}$ is not within the threshold $E_{th}$, the method 20 returns to the operation S222, and the operations S222 to S228 are performed again. When the error E is not within the threshold $E_{th}$, the conditional parameters and computational parameters are updated, and the Trouton ratio $T_r$ is obtained again according to the updated conditional parameters and computational parameters.

In some embodiments, when the error E is a positive value and greater than the threshold $E_{th}$, $T_0$ (in the equation (5)) of the computational parameters is increased 1 degree to update the computational parameters (operated in operation S226), wherein $T_0$ is an initial temperature. In other embodiments, when the error E is a positive value and greater than the threshold $E_{th}$, $\lambda_T$ of the computational parameters is increased to update the computational parameters (operated in operation S226). In various embodiments, when the error E is a positive value and greater than the threshold $E_{th}$, $n_T$ of the computational parameters is increased to update the computational parameters (operated in operation S226).

In some embodiments, when the error E is a negative value and less than the threshold $E_{th}$, $T_0$ of the computational parameters is decreased 1 degree to update the computational parameters. In other embodiments, when the error E is a negative value and less than the threshold $E_{th}$, $\lambda_T$ of the computational parameters is decreased to update the computational parameters (operated in operation S226). In various embodiments, when the error E is a negative value and less than the threshold $E_{th}$, $n_T$ of the computational parameters is decreased to update the computational parameters (operated in operation S226).

When the error E of the estimated pressure drop $\Delta P_{est}$ is within the threshold $E_{th}$, the method 20 proceeds to operation S232. In operation S232, the viscosity profile $\eta(\dot{\gamma})$ is obtained according to the conditional parameters and the computational parameters. When the error E is within the threshold $E_{th}$, the equations (1), (2), (3) and (11) are fitted well, and the viscosity profile $\eta(\dot{\gamma})$ obtained from equations (1) to (19) is reliable.

Based on the above, initial values of the computational parameters of the Trouton function can be determined according to the Binding approximation. By operating the loop formed by the operations S222 to S230, the computational parameters of the Trouton function can be updated to be convergence (fitted well). In some embodiments, To is a dominant parameter among the computational parameters of the Trouton function.

Figure 4:
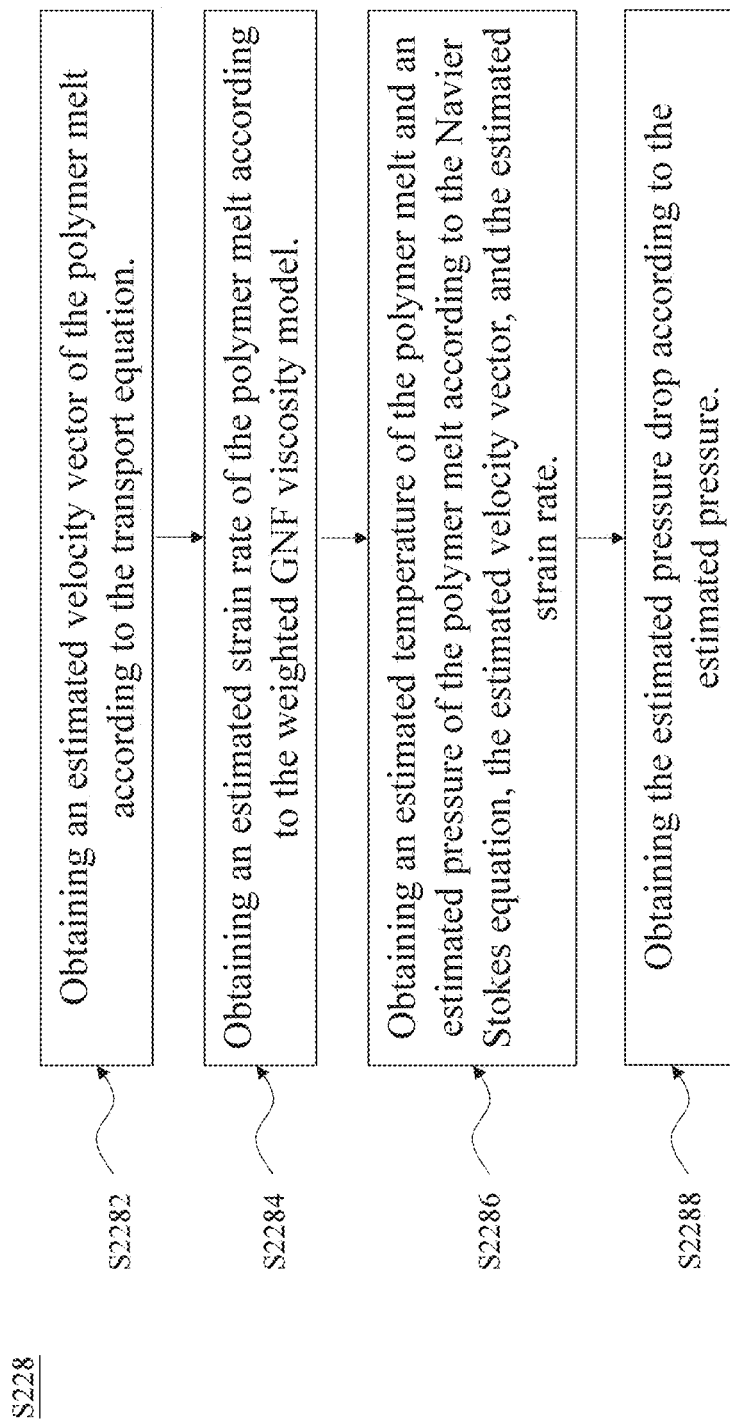
FIG. 4 is a detailed flowchart of the method shown in FIG. 2 according to some embodiments of the present disclosure.

Reference is made to FIG. 4. FIG. 4 is a detailed flowchart of operation S228 according to some embodiments of the present disclosure. After the conditional parameters and the computational parameters are determined, the estimated pressure drop $\Delta P_{est}$ can be obtained from the equations (1), (2), (3) and (11). Obtaining the estimated pressure drop $\Delta P_{est}$ (operation S228) includes operations S2282, S2284, S2286 and S2288.

In operation S2282, the estimated velocity vector $u_{est}$ of the polymer melt PM is obtained according to the transport equation.

In operation S2284, the estimated strain rate fest of the polymer melt PM is obtained according to the weighted GNF viscosity model.

In operation S2286, the estimated temperature $T_{est}$ and the estimated pressure $P_{est}$ of the polymer melt PM are obtained according to the Navier Stokes equation, the estimated tensor $u_{est}$, and the estimated strain rate $\dot{\gamma}_{est}$.

In operation S2288, the estimated pressure drop $\Delta P_{est}$ is obtained according to the estimated pressure $P_{est}$. In some embodiments, the operation S228 is iteratively performed. In other words, after a first round of the operations S2282 to S2288 is performed, a second round of the operations S2282 to S2288 is performed successively. In some embodiments, the operation S228 is repeated until the estimated velocity vector $u_{est}$, the estimated temperature $\dot{\gamma}_{est}$, and the estimated pressure drop $\Delta P_{est}$ converge to a predetermined velocity vector $u_{pre}$, a predetermined temperature $T_{pre}$, and the predetermined pressure drop $\Delta P_{pre}$, respectively.

Figure 5:
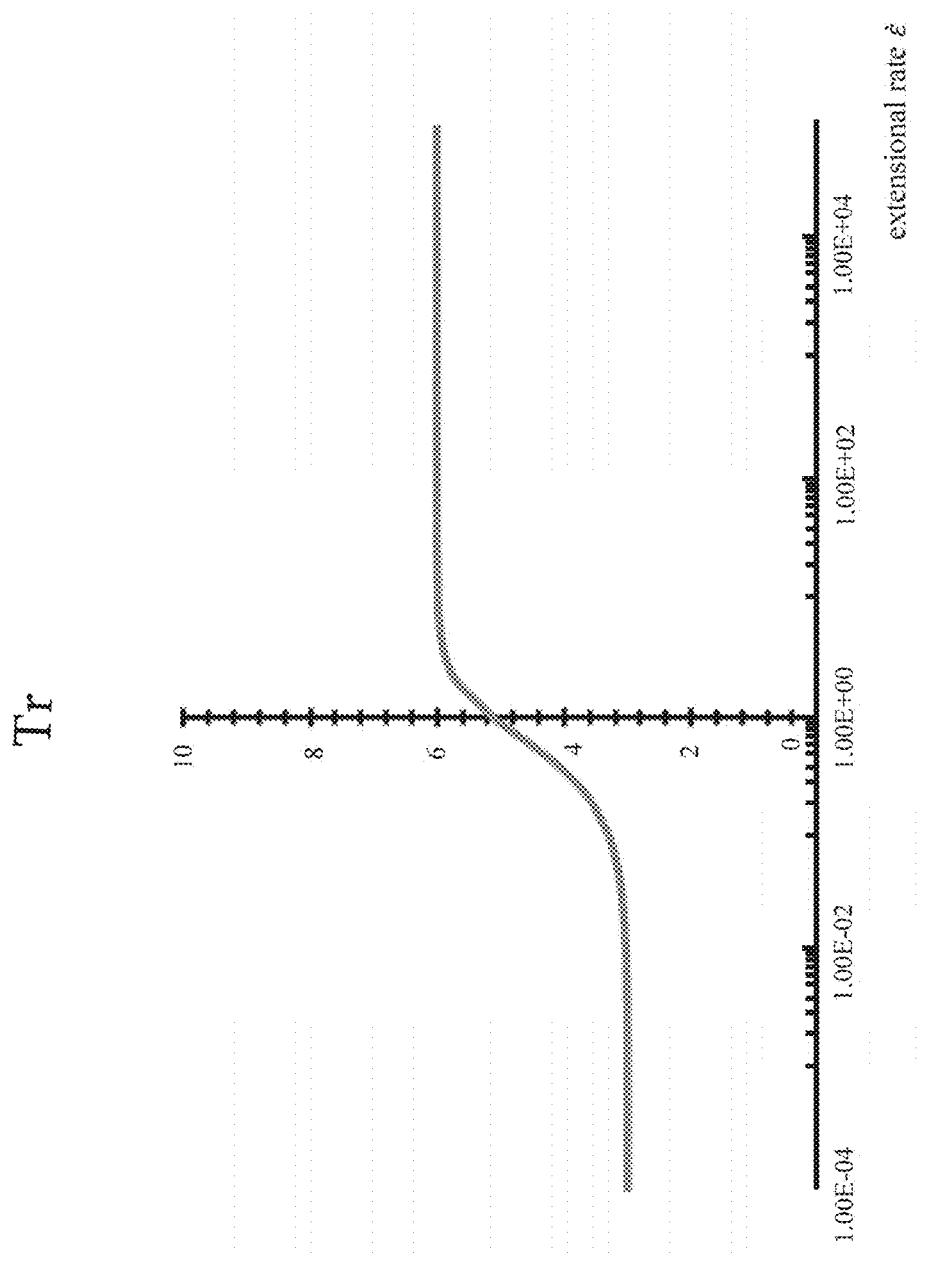
FIG. 5 is a schematic diagram of a Trouton ratio against an extensional rate according to some embodiments of the present disclosure.
Figure 6:
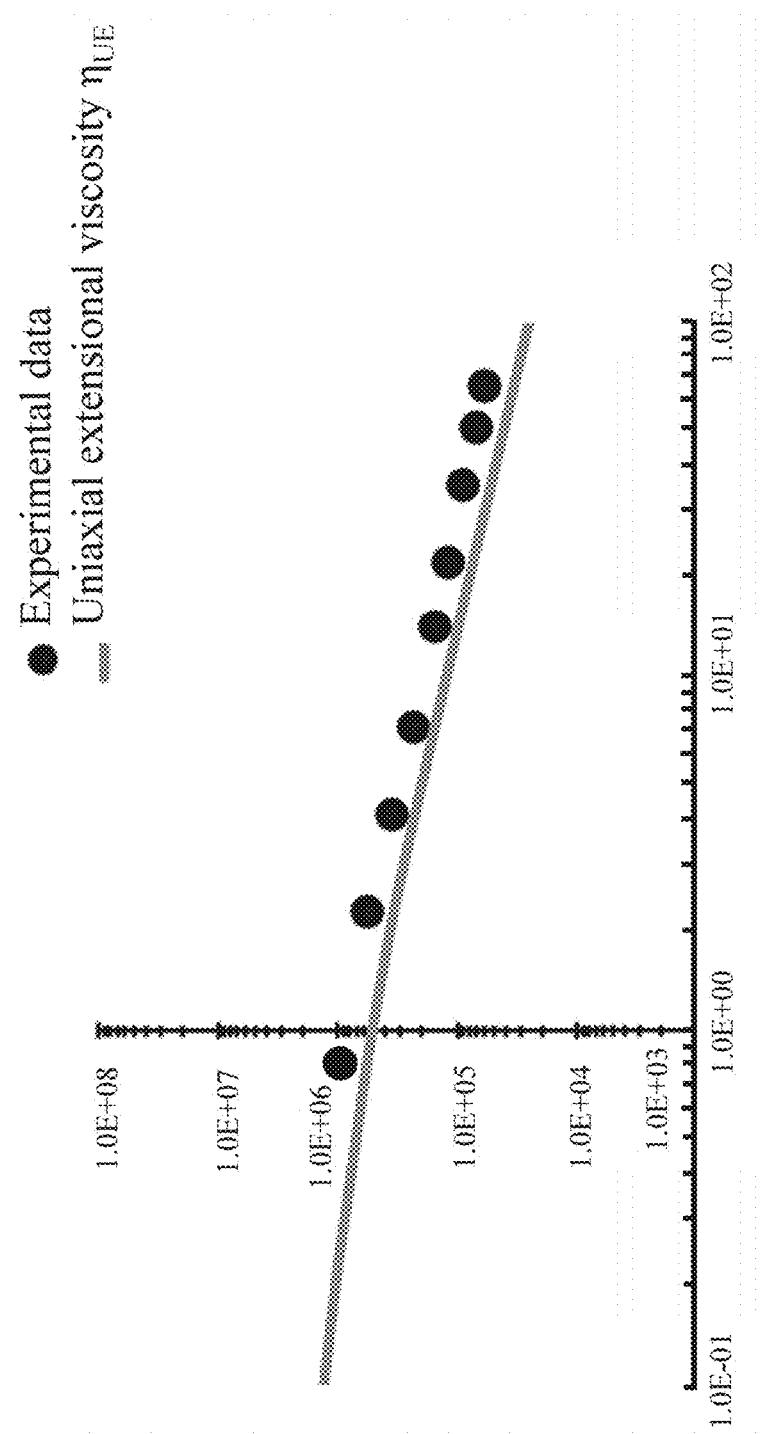
FIG. 6 is a schematic diagram of a uniaxial extensional viscosity and an experimental data against an extensional rate according to some embodiments of the present disclosure.
Figure 7:
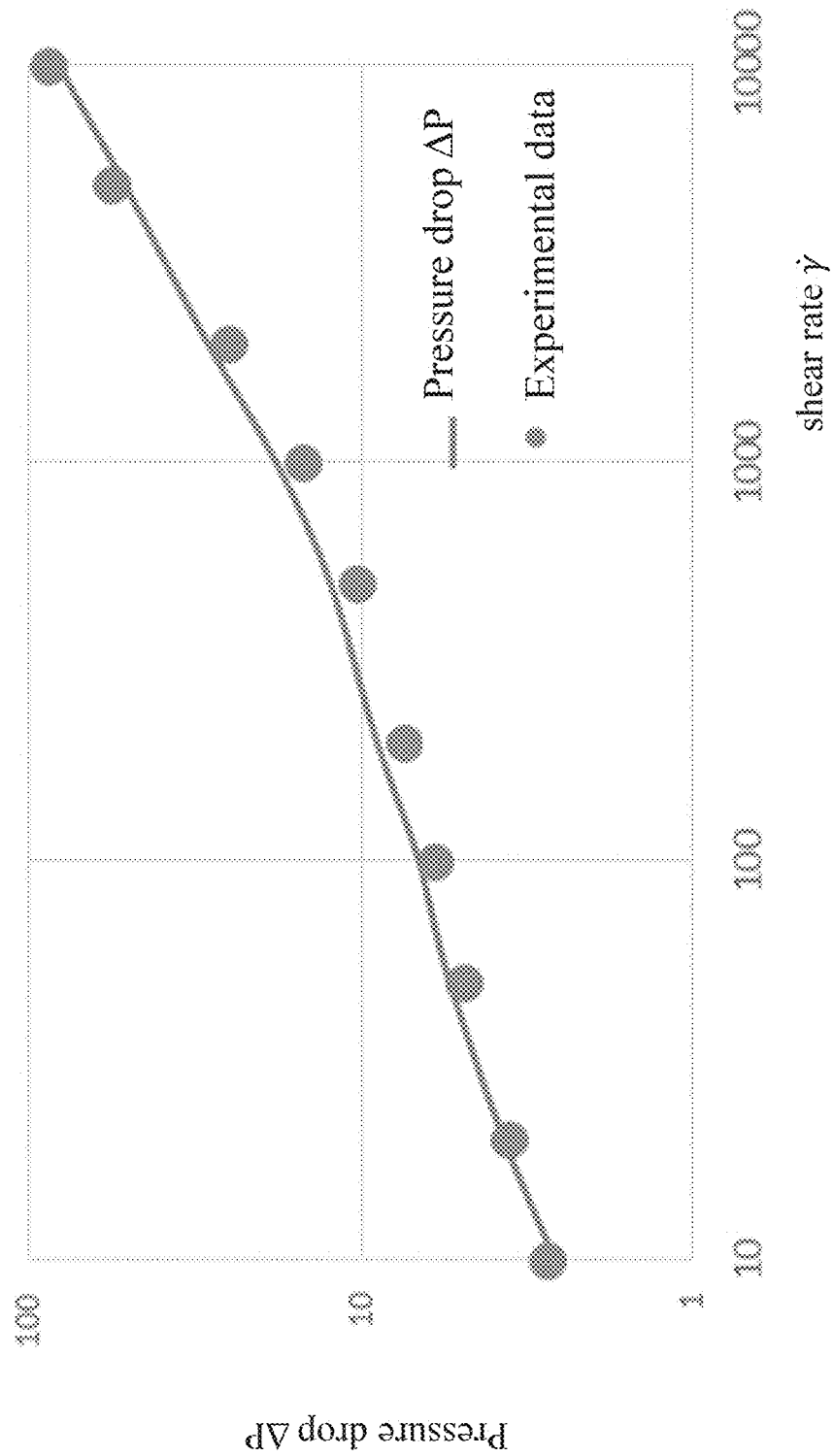
FIG. 7 is a schematic diagram of a pressure drop and an experimental data against a shear rate according to some embodiments of the present disclosure.

Reference is made to FIG. 5, FIG. 6 and FIG. 7. FIG. 5 is a schematic diagram of the Trouton ratio $T_r$ against the extensional rate $\dot{\varepsilon}$ according to some embodiments of the present disclosure. FIG. 6 is a schematic diagram of the uniaxial extensional viscosity $\eta_{UE}$ and an experimental data against the extensional rate $\dot{\varepsilon}$ according to some embodiments of the present disclosure. FIG. 7 is a schematic diagram of the pressure drop $\Delta P$ and an experimental data against the shear rate $\dot{\gamma}$ according to some embodiments of the present disclosure. The Trouton ratio $T_r$, the uniaxial extensional viscosity $\eta_{UE}$, and the pressure drop $\Delta P$ shown in FIG. 5 to FIG. 7 are obtained by the method 20.

In this embodiment, the Trouton ratio $T_r$ is divided into two sections, including a high strain rate section and a low strain rate section. The two-sectional Trouton ratio $T_r$ is expressed by equations (20) and (21).

$$T_r(\dot{\gamma}) = 3 + \frac{T_L}{[1 + (\lambda_L \dot{\gamma})^{-2}]^{n_L}}, \dot{\gamma} < \dot{\gamma}^* \tag{20}$$

$$T_r(\dot{\gamma}) = 3 + \frac{T_H}{[1 + (\lambda_H \dot{\gamma})^{-2}]^{n_H}}, \dot{\gamma} \geq \dot{\gamma}^* \tag{21}$$

$T_L$, $T_H$, $n_L$, $n_H$, $\lambda_H$, and $\lambda_L$ are fitting parameters, and are the computational parameters. More specifically, $T_L$ and $T_H$ are a low strain rate portion and a high strain rate portion of $T_0$, respectively; $n_L$ and $n_H$ are a low strain rate portion and a high strain rate portion of $n_T$, respectively; and $\lambda_H$, and $\lambda_L$ are a high strain rate portion and a low strain rate portion of $\lambda_T$, respectively.

Based on the data shown in FIG. 5 and FIG. 6, the pressure drop $\Delta P$ against the shear rate $\dot{\gamma}$ is obtained, and the viscosity profile $\eta(\Delta P)$ is thus obtained using the viscosity profile $\eta(\dot{\gamma})$ and a correspondence between the pressure drop $\Delta P$ and the shear rate $\dot{\gamma}$ shown in FIG. 7.

In addition, the uniaxial extensional viscosity $\eta_{UE}$ and the pressure drop $\Delta P$ are substantially aligned with the experimental data, i.e., the uniaxial extensional viscosity $\eta_{UE}$ and the pressure drop $\Delta P$ obtained by the method 20 are accurate and reliable. Therefore, the viscosity profile $\eta(\Delta P)$ is also reliable.

Figure 8:
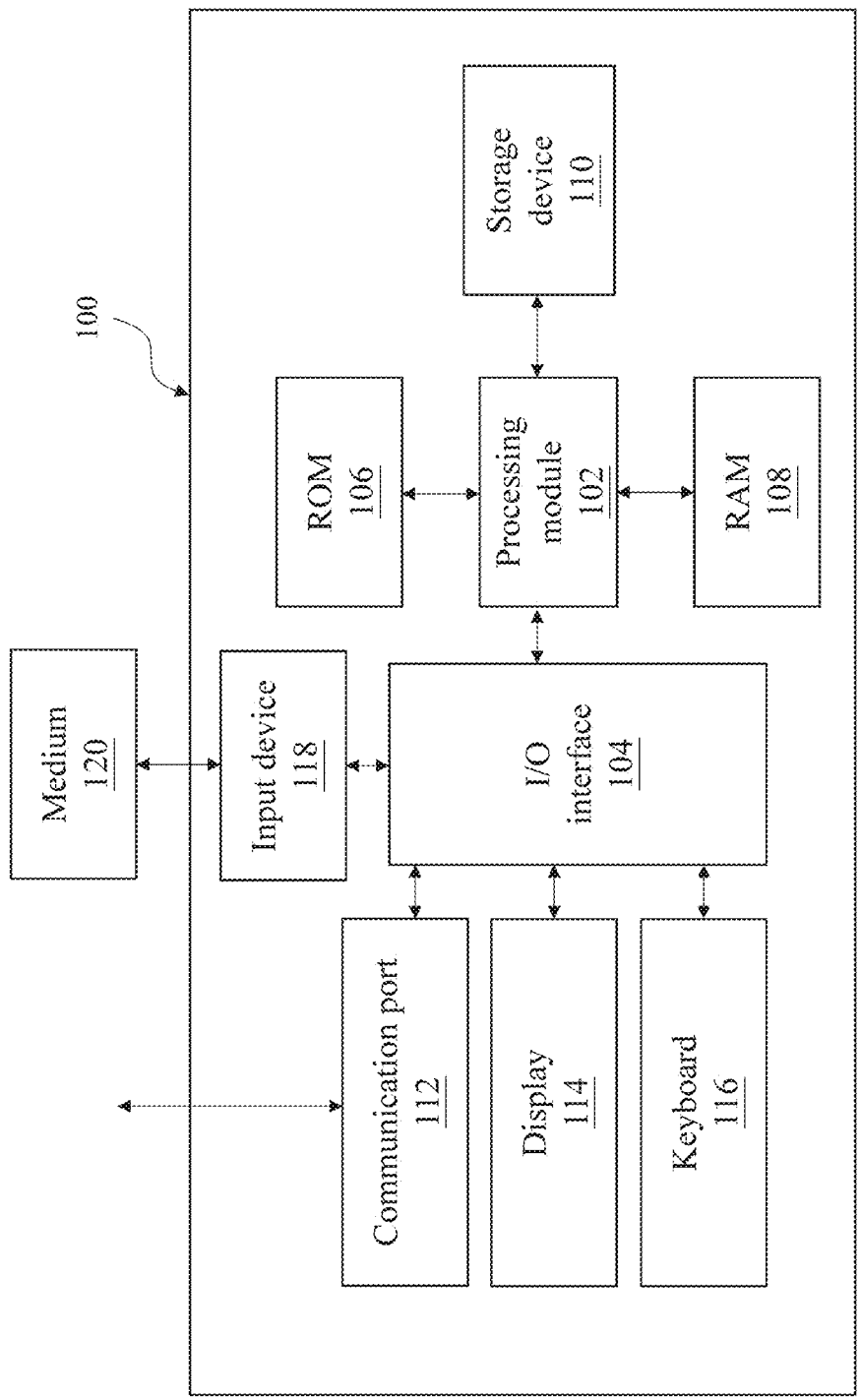
FIG. 8 is a functional block diagram of the rheometer shown in FIG. 1 according to some embodiments of the present disclosure

In some embodiments, the rheometer 100 shown in FIG. 1 is configured to execute CAE simulation software (such as the calculations performed in method 20). Please refer to FIG. 8. FIG. 8 is a functional block diagram of the rheometer 100 according to some embodiments of the present disclosure.

In some embodiments, the rheometer 100 has an internal-implemented computer, and includes a processing module 102 such as a processor adapted to perform a computer-implemented simulation method for use in capillary injection, an input/output (I/O) interface 104 electrically coupled to the processing module 102, a read-only memory (ROM) 106, a random access memory (RAM) 108, and a storage device 110. The ROM 106, the RAM 108, and the storage device 110 are communicatively coupled to the processing module 102.

The rheometer 100 further includes a communication port 112 configured to transmit instructions to control the piston 120, a display 114, a keyboard 116, and an input device 118. The input device 118 may include a card reader, an optical disk drive or any other device that allows the rheometer 100 to receive input from the on-site technicians. In some embodiments, the input device 118 is configured to input computer instructions (software algorithms) stored in a non-transitory computer-readable medium 120, and the processing module 102 is configured to execute operations for performing the method 20 according to the computer instructions. In some embodiments, the processing module 102 reads software algorithms from the input device 118 or the storage device 110, executes the calculation steps, and stores the calculated result in the RAM 108.

In our present work, at least some the operations of the method 20 to obtain the extensional viscosity $\eta_E$ has been implemented in commercial simulation software, Moldex3D (CoreTech System Co. of Taiwan), and the rheometer 100 carries the commercial simulation software to obtain the extensional viscosity $\eta_E$.

One aspect of the present disclosure provides a method of measuring an extensional viscosity of a polymer melt and a capillary injection system. The method includes operations of: based on a weighted GNF viscosity model, obtaining a viscosity profile of the polymer melt according to a transport equation, a Navier Stokes equation, and a Trouton function; measuring a pressure drop of the polymer melt; obtaining a general viscosity of the polymer melt from the viscosity profile according to the pressure drop, wherein the general viscosity comprises a shear viscosity of the polymer melt and the extensional viscosity of the polymer melt; and extracting the extensional viscosity from the general viscosity.

Another aspect of the present disclosure provides a capillary injection system for measuring an extensional viscosity of a polymer melt, including a barrel, a capillary, a piston, a first pressure transducer, a second pressure transducer, and a rheometer. The barrel has a cavity configured to contain a polymer melt. The capillary is coupled to the barrel. The piston is coupled to the barrel, and configured to provide a force to the polymer melt to make the polymer melt flow through the capillary. The first pressure transducer is configured to measure a first pressure of the polymer melt at an inlet of the capillary. The second pressure transducer is configured to measure a second pressure of the polymer melt at an outlet of the capillary. The rheometer is configured to perform operations of: based on a weighted GNF viscosity model, obtain a viscosity profile of the polymer melt according to a transport equation, a Navier Stokes equation, and a Trouton function; obtain a general viscosity of the polymer melt from the viscosity profile according to the first pressure and the second pressure, wherein the general viscosity comprises a shear viscosity of the polymer melt and the extensional viscosity of the polymer melt; and extract the extensional viscosity from the general viscosity.

Although the present disclosure and its advantages have been described in detail, it should be understood that various changes, substitutions and alterations can be made herein without departing from the spirit and scope of the disclosure as defined by the appended claims. For example, many of the processes discussed above can be implemented in different methodologies and replaced by other processes, or a combination thereof.

Moreover, the scope of the present application is not intended to be limited to the particular embodiments of the process, machine, manufacture, composition of matter, means, methods and steps described in the specification. As one of ordinary skill in the art will readily appreciate from the present disclosure, processes, machines, manufacture, compositions of matter, means, methods, or steps, presently existing or later to be developed, that perform substantially the same function or achieve substantially the same result as the corresponding embodiments described herein, may be utilized according to the present disclosure. Accordingly, the appended claims are intended to include within their scope such processes, machines, manufacture, compositions of matter, means, methods and steps.

What is claimed is:

1. A method of measuring an extensional viscosity of a polymer melt, comprising:
    based on a weighted generalized Newtonian fluid (GNF) viscosity model, obtaining a viscosity profile of the polymer melt according to a transport equation, a Navier Stokes equation, and a Trouton function;
    measuring a pressure drop of the polymer melt;
    obtaining a general viscosity of the polymer melt from the viscosity profile according to the pressure drop, wherein the general viscosity comprises a shear viscosity of the polymer melt and the extensional viscosity of the polymer melt; and
    extracting the extensional viscosity from the general viscosity.

2. The method of claim 1, wherein the polymer melt flows through a capillary, and a difference between a pressure at an outlet of the capillary and a pressure at an inlet of the capillary is the pressure drop.

3. The method of claim 1, wherein based on the weighted GNF viscosity model, obtaining the viscosity profile of the polymer melt according to the transport equation, the Navier Stokes equation, and the Trouton function comprises:
    determining a plurality of conditional parameters of the transport equation and the Navier Stokes equation;
    determining a plurality of computational parameters of the Trouton function;
    obtaining a Trouton ratio of the Trouton function according to the plurality of computational parameters;
    based on the weighted GNF viscosity model, obtaining an estimated pressure drop of the polymer melt according to the Trouton ratio, the transport equation, and the Navier Stokes equation;
    determining whether an error of the estimated pressure drop is within a threshold; and
    when the error of the estimated pressure drop is within the threshold, obtaining the viscosity profile according to the plurality of conditional parameters and the plurality of computational parameters.

4. The method of claim 3, wherein when the error of the estimated pressure drop is not within the threshold, updating the plurality of computational parameters of the Trouton ratio function.

5. The method of claim 4, wherein when the error is a positive value, an initial temperature of the plurality of conditional parameters is increased 1 degree so as to update the predetermined temperature.

6. The method of claim 4, wherein when the error is a negative value, an initial temperature of the plurality of conditional parameters is decreased 1 degree so as to update the predetermined temperature.

7. The method of claim 3, wherein the plurality of conditional parameters comprises a predetermined velocity vector of the polymer melt, a predetermined temperature of the polymer melt, and a predetermined pressure drop of the polymer melt.

8. The method of claim 7, wherein based on the GNF viscosity model, obtaining the estimated pressure drop of the polymer melt according to the Trouton ratio, the transport equation, and the Navier Stokes equation comprises:
  obtaining an estimated velocity vector of the polymer melt according to the transport equation;
  obtaining an estimated strain rate of the polymer melt according to the weighted GNF viscosity model;
  obtaining an estimated temperature of the polymer melt and an estimated pressure of the polymer melt according to the Navier Stokes equation, the estimated velocity vector, and the estimated strain rate; and
  obtaining the estimated pressure drop according to the estimated pressure,
  wherein the estimated velocity vector, the estimated temperature, and the estimated pressure drop converge to the predetermined velocity vector, the predetermined temperature, and the predetermined pressure drop, respectively.

9. The method of claim 7, wherein the error of the estimated pressure drop is equal to a difference between the estimated pressure drop and the predetermined pressure drop divided by the predetermined pressure drop.

10. The method of claim 3, wherein the threshold is about ±10%.

11. The method of claim 1, wherein the Trouton function is represented using an expression:

$$T_r(\dot{\gamma}) = \frac{\eta_E}{\eta_S}$$

-continued
$$T_r(\dot{\gamma}) = 3 + \frac{T_0}{[1 + (\lambda_T \dot{\gamma})^{-2}]^{n_T}}$$

wherein $T_r(\dot{\gamma})$ represents a Trouton ration with respect to a shear rate $\dot{\gamma}$, $\eta_E$ represents the extensional viscosity, $\eta_S$ represents a shear viscosity, $T_0$ represents an initial temperature, $\lambda_T$ represents a relaxation time, and $n_T$ represents a power index.

12. A capillary injection system for measuring an extensional viscosity of a polymer melt, comprising:
  a barrel, having a cavity configured to contain the polymer melt;
  a capillary, coupled to the barrel;
  a piston, coupled to the barrel, configured to provide a force to the polymer melt to make the polymer melt flow through the capillary;
  a first pressure transducer, configured to measure a first pressure of the polymer melt at an inlet of the capillary;
  a second pressure transducer, configured to measure a second pressure of the polymer melt at an outlet of the capillary; and
  a rheometer, configured to:
    based on a weighted generalized Newtonian fluid (GNF) viscosity model, obtain a viscosity profile of the polymer melt according to a transport equation, a Navier Stokes equation, and a Trouton function;
    obtain a general viscosity of the polymer melt from the viscosity profile according to the first pressure and the second pressure, wherein the general viscosity comprises a shear viscosity of the polymer melt and the extensional viscosity of the polymer melt; and
    extract the extensional viscosity from the general viscosity.

\* \* \* \* \*